Sept. 2, 1958      D. R. PEARL      2,850,103
PROPELLER MOUNTED ON ENGINE CASING
Filed May 14, 1956
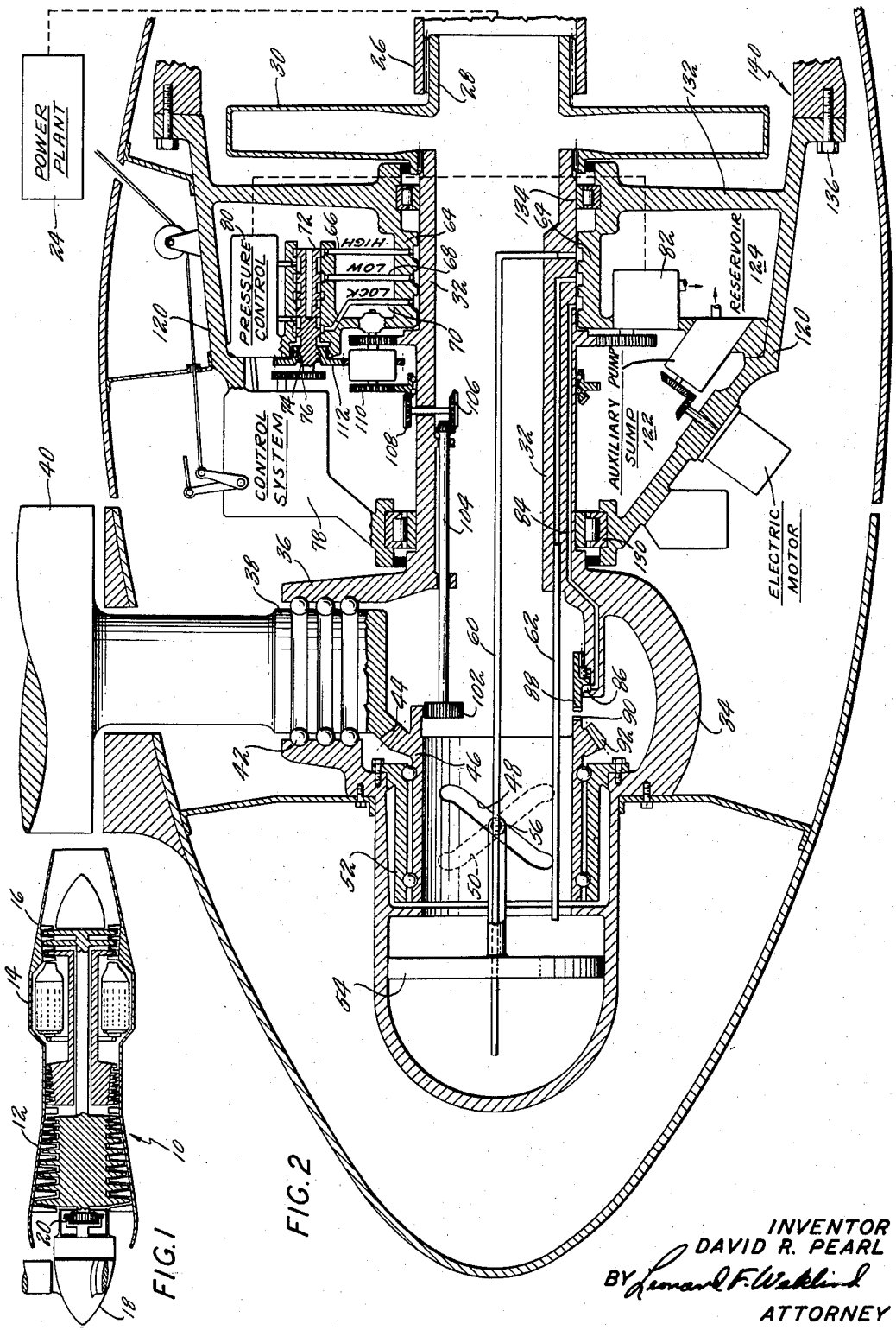
INVENTOR
DAVID R. PEARL
BY *Leonard F. Wakelin*
ATTORNEY

United States Patent Office 2,850,103
Patented Sept. 2, 1958

2,850,103

PROPELLER MOUNTED ON ENGINE CASING

David R. Pearl, West Hartford, Conn., assignor to United Aircraft Corporation, East Hartford, Conn., a corporation of Delaware Application May 14, 1956, Serial No. 586,344

2 Claims. (Cl. 170—135.7)

This invention relates to propellers and more particularly to variable pitch propellers having integral hub and support means for mounting directly to an engine casing.

It is an object of this invention to provide a variable pitch propeller having a hub and propeller casing mounted directly to the power plant casing with the propeller casing containing the pitch control mechanism and the propeller shaft supporting means.

It is another object of this invention to provide a propeller of the type described wherein the propeller shaft support casing forms an integral fluid reservoir and houses the propeller control system and pumps.

It is a further object of this invention to provide a propeller and casing of the type described including an oil transfer bearing contained within the propeller casing and including a feedback drive between the propeller blades and the control mechanism within the propeller casing.

A still further object of this invention is to provide a propeller wherein the usual spline and cone method of mounting is eliminated while further maintaining the diameter of the rotating seals to a minimum. In addition the non-rotating mounting for the pumps, valves and controls avoids the problems inherent in high centrifugal loading and reduces the weight of the propeller load carrying structure.

These and other objects of this invention will become readily apparent from the following detailed description of the drawing in which:

Fig. 1 is a schematic illustration of a turboprop power plant including the propeller mounted thereon.

Fig. 2 is an enlarged schematic illustration of the propeller assembly.

Referring to Fig. 1, a turboprop power plant is generally indicated at 10 and includes a compressor section 12, a burner section 14 and a turbine section 16. At least one of the turbine stages is intended to drive one of the compressor sections and also the propeller 18 through a reduction gear 20. The propeller of this invention is intended to be mounted directly on the power plant casing so that the propeller casing supports the propeller drive shaft, and the engine drive shaft is not required to support the main propeller assembly.

As shown in Fig. 2, a power plant 24 is operatively connected by means of a female spline coupling 26 to a male spline 28 which in turn is attached to a flexible coupling 30. The coupling 30 is intended to drive the propeller drive shaft 32 which in reality is an aft extension of the hub 34. The hub 34 includes one or more blade sockets 36 in which is mounted the shank 38 of a propeller blade 40 by means of ball bearings 42 or other suitable means. The blade shank 38 includes at its lower end a segmental gear 44 which is geared to a movable cam 46. The movable cam 46 is fixed against axial movement but is free to rotate. The cam 46 is moved via its cam slot 48 which cooperates with a cam slot 50 carried by a stationary cam member 52. Thus when the main servo piston 54 is moved forward or aft, the cam roller 56 acts on the cam surfaces 48 and 50 to rotate the cam member 46 and thus vary the pitch of the propeller. The particular cam mechanism and the operation thereof is more clearly illustrated and described in Patent No. 2,174,717, Caldwell et al., issued October 3, 1939 and in Patent No. 2,280,713, E. Martin et al., issued April 21, 1942.

The piston 54 of the pitch change motor is controlled by fluid under pressure which is fed to the forward side of the motor by a high pitch line 60 or to the aft side of the motor by a low pitch line 62. Fluid under pressure is fed to these lines 60, 62 through an oil transfer bearing 64 which is in fluid sealing contact with the shaft extension 32. The oil transfer bearing has a high pitch line 66, a low pitch line 68 and a lock pitch line 70 operatively connected thereto. Fluid under pressure is selectively directed to these lines by means of a distributor valve 72. The distributor valve is reciprocated by means of a screw thread 74 driven by a gear 76 which in turn is controlled by a control system indicated by the box 78. The pitch control may be of any suitable well-known type of control, either electrical or mechanical. One type of control is illustrated and described in patent application Serial No. 517,544, filed June 23, 1955, by C. B. Brahm. The control system 78 may also be of the type illustrated and described in patent application Serial No. 508,882, filed May 17, 1955, by W. E. Diefenderfer.

The pressure control 80 regulates the supply of fluid under pressure from the pump 82 to the distributor valve 72.

In passing it might be noted that the pitch lock line 70 feeds fluid under pressure to a line 84 leading to a variable volume chamber 86 which causes a pitch lock element 88 to be disengaged from a toothed portion 90 carried by the gear 92 of the movable cam 46. The element 88 is intended to engage with the toothed portion 90 to prevent any pitch change of the propeller upon any failure of pressure. Various forms of pitch locks of this type are well-known in the art. This pitch lock does not form a specific part of this invention.

Any pitch changes of the propeller blade 40 are reflected through rotation of a pinion gear 102 which drives a shaft 104 and bevel gearing 106, 108. The bevel gear 108 drives a gear 110 which rotates a feedback sleeve 112. The feedback sleeve 112 is intended to place the control system back into a null position. The feedback mechanism and the gear type control system is more clearly illustrated and described in Patent No. 2,664,960, issued January 5, 1954, to Longfellow et al. and Patent No. 2,666,490, issued January 19, 1954, to Richmond. The specific type of feedback drive which passes through the propeller drive shaft is more clearly illustrated in Patent No. 2,308,488, issued January 19, 1943, to Caldwell et al.

The propeller drive shaft extension 32 and the control system just described is housed in a chamber defined by the bell shaped housing 120. The housing 120 or control casing forms a reservoir 124 for the hydraulic fluid and also houses all the propeller hydraulic control system. Thus any leakage, as for example from the valves, pumps and oil transfer bearing, will automatically be collected in the sump 122 and eventually return to the reservoir within the casing or housing 120. Leakage from the distributor valve will be collected in reservoir 124. The casing 120 includes a forward bearing 130 which forms a forward support for the shaft extension 32. The casing 120 also includes a rearwardly spaced web 132 which carries a second bearing 134 for supporting the shaft extension 32 at a point aft of the bearing 130. The entire propeller control system and elements thereof are located between the bearings 130 and 134 and the forward part of the casing 120 and the web 132.

The casing 120 at its aft end includes a plurality of peripherally spaced mounting means such as the bolts 136 which are adapted to connect the casing 120 to the casing of the power plant. A portion of the power plant casing is generally indicated at 140.

As a result of this invention, it is apparent that the rotating propeller portion including the hub are flexibly connected to the drive shaft of the power plant while the main support for the propeller hub comprises a casing which is directly and rigidly connected to the power plant casing. The propeller casing 120 which supports the shaft extension of the propeller hub not only provides the mounting for the shaft extension but also forms a fluid type reservoir for all the hydraulic controls for the pitch changing mechanism of the propeller.

Although only one embodiment of this invention has been illustrated and described herein, it will be apparent that various changes and modifications may be made in the construction and arrangement of the various parts without departing from the scope of this novel concept.

What it is desired by Letters Patent is.

1. In a variable pitch propeller having a hub, a plurality of blades supported for pitch changing movements relative to said hub, an integral shaft extending aft of said hub, a casing having a generally conical shape whereby the casing surrounds said shaft and has a cross-sectional configuration diverging in an aft direction, the apex of said casing being located adjacent the aft end of said hub, first bearing carried by the apex end of said casing, second bearing means spaced aft along the axis of said shaft from said first bearing means for supporting said shaft adjacent its aft end, hydraulic control means located within said casing and between said bearings including hydraulic connections to said blades for varying the pitch thereof, and feedback mechanism located within said shaft and operatively connected at one end to said blades, the other end of said feedback mechanism being operatively connected to said control means including a mechanical connection passing through the wall of said shaft.

2. In a variable pitch propeller having a hub, a plurality of blades supported for pitch changing movements relative to said hub, a servo motor within said hub for varying the pitch of said blades, an integral shaft extending aft of said hub, a casing having a generally conical shape whereby the casing surrounds said shaft and has a cross-sectional configuration diverging in an aft direction, the apex of said casing being located adjacent the aft end of said hub, first bearing means carried by the apex end of said casing, second bearing means spaced aft along the axis of said shaft from said first bearing means for supporting said shaft adjacent its aft end, web means connecting said casing and said second bearing means and forming a fluid tight chamber with the casing portion forward thereof, hydraulic control means located within said casing and between said bearings including hydraulic connections to said servo motor for varying the pitch of said blades, a distributor valve forming a part of said hydraulic connections to said servo motor including a fluid transfer bearing directing fluid through said shaft, leakage fluid from said bearing being automatically collected in said chamber, and feedback mechanism passing through said shaft and operatively connecting said servo motor and said distributor valve.

References Cited in the file of this patent

UNITED STATES PATENTS

| | | |
|---|---|---|
| 2,361,954 | Martin | Nov. 7, 1944 |
| 2,371,873 | Martin | Mar. 20, 1945 |
| 2,592,124 | Diefenderfer | Apr. 8, 1952 |
| 2,727,577 | De Muth | Dec. 20, 1955 |